US007849369B2

(12) United States Patent  
Holt

(10) Patent No.: US 7,849,369 B2  
(45) Date of Patent: Dec. 7, 2010

(54) FAILURE RESISTANT MULTIPLE COMPUTER SYSTEM AND METHOD

(75) Inventor: John Matthew Holt, Hornchurch (GB)

(73) Assignee: Waratek Pty Ltd., Lindfield, New South Wales (AU)

( * ) Notice: Subject to any disclaimer, the term of this patent is extended or adjusted under 35 U.S.C. 154(b) by 352 days.

(21) Appl. No.: 11/583,351

(22) Filed: Oct. 18, 2006

(65) Prior Publication Data

US 2007/0174734 A1  Jul. 26, 2007

Related U.S. Application Data

(60) Provisional application No. 60/730,512, filed on Oct. 25, 2005.

(51) Int. Cl.  
*G06F 11/00* (2006.01)

(52) U.S. Cl. .............................. 714/48; 714/3; 709/248

(58) Field of Classification Search .................. 714/3, 714/48; 709/248; 718/1  
See application file for complete search history.

(56) References Cited

U.S. PATENT DOCUMENTS

| | | | |
|---|---|---|---|
| 4,445,176 A | | 4/1984 | Burk et al. |
| 4,829,524 A | | 5/1989 | Yoshida |
| 4,928,224 A | * | 5/1990 | Zulian ........................ 710/305 |
| 4,969,092 A | | 11/1990 | Shorter |
| 5,089,957 A | | 2/1992 | Stultz et al. |
| 5,214,776 A | | 5/1993 | Bagnoli et al. |
| 5,274,789 A | * | 12/1993 | Costa et al. .................. 711/206 |
| 5,291,581 A | | 3/1994 | Cutler et al. |
| 5,291,597 A | | 3/1994 | Shorter |
| 5,418,966 A | | 5/1995 | Madduri |
| 5,434,994 A | | 7/1995 | Shaheen et al. |

(Continued)

FOREIGN PATENT DOCUMENTS

EP  0528536 A2  2/1993

(Continued)

OTHER PUBLICATIONS

Bal et al., "A Distributed Implementation of the Shared Data-Object Model", Proc. USENIX Workshop on Experiences with Distributed and Multiprocessor Systems pp. 1-19 (1989).

(Continued)

*Primary Examiner*—Philip Guyton  
(74) *Attorney, Agent, or Firm*—Pillsbury Winthrop Shaw Pittman LLP

(57) ABSTRACT

The updating of only some memory locations in a multiple computer environment in which at least one applications program (50) executes simultaneously on a plurality of computers M1, M2 . . . Mn each of which has a local memory, is disclosed. Memory locations (A, B, D, E, X) in said local memory are categorized into two groups. The first group of memory locations (X1, X2, . . . Xn, A1, A2, . . . An) are each present in other computers. The second group of memory locations (B, E) are each present only in the computer having the local memory including the memory location. Changes to the contents of memory locations in the first group only are transmitted to all other computers. A computer failure detection mechanism is disclosed to prevent updating of any first group memory locations of any failed computer.

33 Claims, 10 Drawing Sheets

U.S. PATENT DOCUMENTS

| | | | |
|---|---|---|---|
| 5,444,856 A | | 8/1995 | Bowers et al. |
| 5,488,723 A | | 1/1996 | Baradel et al. |
| 5,490,250 A | | 2/1996 | Reschke et al. |
| 5,495,570 A | | 2/1996 | Heugel et al. |
| 5,544,345 A | | 8/1996 | Carpenter et al. |
| 5,568,609 A | * | 10/1996 | Sugiyama et al. ............. 714/43 |
| 5,612,865 A | | 3/1997 | Dasgupta |
| 5,621,885 A | | 4/1997 | Del Vigna, Jr. |
| 5,802,585 A | | 9/1998 | Scales et al. |
| 5,815,649 A | | 9/1998 | Utter et al. |
| 5,918,248 A | | 6/1999 | Newell et al. |
| 5,940,870 A | * | 8/1999 | Chi et al. ..................... 711/206 |
| 6,049,809 A | | 4/2000 | Raman et al. |
| 6,049,853 A | | 4/2000 | Kingsbury et al. |
| 6,101,527 A | | 8/2000 | Lejeune et al. |
| 6,148,377 A | * | 11/2000 | Carter et al. ................. 711/147 |
| 6,163,801 A | | 12/2000 | O'Donnell et al. |
| 6,178,441 B1 | | 1/2001 | Elnozahy |
| 6,192,514 B1 | | 2/2001 | Lurndal |
| 6,266,781 B1 | | 7/2001 | Chung et al. |
| 6,314,558 B1 | | 11/2001 | Angel et al. |
| 6,324,587 B1 | | 11/2001 | Trenbeath et al. |
| 6,327,630 B1 | | 12/2001 | Carroll et al. |
| 6,370,625 B1 | | 4/2002 | Carmean et al. |
| 6,389,423 B1 | | 5/2002 | Sakakura |
| 6,425,016 B1 | | 7/2002 | Banavar et al. |
| 6,553,037 B1 | | 4/2003 | Pivowar et al. |
| 6,571,278 B1 | | 5/2003 | Negishi et al. |
| 6,574,628 B1 | | 6/2003 | Kahn et al. |
| 6,574,674 B1 | | 6/2003 | May et al. |
| 6,611,955 B1 | | 8/2003 | Logean et al. |
| 6,625,751 B1 | | 9/2003 | Starovic et al. |
| 6,668,260 B2 | | 12/2003 | Zoltan |
| 6,757,896 B1 | | 6/2004 | Cohen et al. |
| 6,760,903 B1 | | 7/2004 | Morshed et al. |
| 6,775,831 B1 | | 8/2004 | Carrasco et al. |
| 6,779,093 B1 | | 8/2004 | Gupta |
| 6,782,492 B1 | * | 8/2004 | Nakaso ........................ 714/42 |
| 6,823,511 B1 | | 11/2004 | McKenney et al. |
| 6,862,608 B2 | | 3/2005 | Buhlman et al. |
| 6,882,645 B2 | | 4/2005 | Jones |
| 6,954,794 B2 | * | 10/2005 | Rudd et al. .................. 709/230 |
| 6,957,251 B2 | | 10/2005 | Wisner et al. |
| 6,965,571 B2 | | 11/2005 | Webber |
| 6,968,372 B1 | | 11/2005 | Thompson et al. |
| 6,975,629 B2 | | 12/2005 | Welin |
| 7,010,576 B2 | | 3/2006 | Bae |
| 7,020,736 B1 | | 3/2006 | Cherukuri |
| 7,031,989 B2 | | 4/2006 | Elmendorf et al. |
| 7,047,341 B2 | | 5/2006 | Jung |
| 7,047,521 B2 | | 5/2006 | Bunnell |
| 7,058,826 B2 | | 6/2006 | Fung |
| 7,082,604 B2 | | 7/2006 | Schneiderman |
| 7,124,320 B1 | | 10/2006 | Wipfel |
| 7,206,827 B2 | | 4/2007 | Viswanath et al. |
| 7,283,476 B2 | | 10/2007 | Bare |
| 7,392,421 B1 | | 6/2008 | Bloomstein et al. |
| 7,483,443 B2 | | 1/2009 | Newson et al. |
| 7,548,539 B2 | | 6/2009 | Kouretas et al. |
| 7,549,150 B2 | | 6/2009 | Yu |
| 2001/0051955 A1 | | 12/2001 | Wong |
| 2002/0154606 A1 | | 10/2002 | Duncan et al. |
| 2002/0199172 A1 | | 12/2002 | Bunnel |
| 2003/0004924 A1 | | 1/2003 | Williams |
| 2003/0005407 A1 | | 1/2003 | Hines |
| 2003/0014548 A1 | | 1/2003 | Valentine et al. |
| 2003/0067912 A1 | | 4/2003 | Mead et al. |
| 2003/0086415 A1 | | 5/2003 | Bernhard et al. |
| 2003/0105816 A1 | | 6/2003 | Goswani |
| 2004/0030766 A1 | | 2/2004 | Witkowski |
| 2004/0044796 A1 | | 3/2004 | Vangal et al. |
| 2004/0073828 A1 | | 4/2004 | Bronstein |
| 2004/0093588 A1 | | 5/2004 | Gschwind et al. |
| 2004/0117571 A1 | | 6/2004 | Chang et al. |
| 2004/0158819 A1 | | 8/2004 | Cuomo et al. |
| 2004/0163077 A1 | | 8/2004 | Dimpsey et al. |
| 2005/0039171 A1 | | 2/2005 | Avakian et al. |
| 2005/0086384 A1 | | 4/2005 | Ernst |
| 2005/0100049 A1 | | 5/2005 | Siminoff |
| 2005/0108481 A1 | | 5/2005 | Iyengar et al. |
| 2005/0132249 A1 | | 6/2005 | Burton et al. |
| 2005/0229022 A1 | | 10/2005 | Koishi |
| 2005/0240737 A1 | | 10/2005 | Holt |
| 2005/0257219 A1 | | 11/2005 | Holt |
| 2005/0262313 A1 | | 11/2005 | Holt |
| 2005/0262513 A1 | | 11/2005 | Holt |
| 2006/0020913 A1 | | 1/2006 | Holt |
| 2006/0080389 A1 | | 4/2006 | Powers et al. |
| 2006/0095483 A1 | | 5/2006 | Holt |
| 2006/0130066 A1 | | 6/2006 | Bozak et al. |
| 2006/0143350 A1 | | 6/2006 | Miloushev et al. |
| 2006/0167878 A1 | | 7/2006 | Hartman |
| 2006/0171333 A1 | | 8/2006 | Shimada et al. |
| 2006/0242464 A1 | | 10/2006 | Holt |
| 2006/0253844 A1 | | 11/2006 | Holt |
| 2006/0265703 A1 | | 11/2006 | Holt |
| 2006/0265704 A1 | | 11/2006 | Holt |
| 2006/0265705 A1 | | 11/2006 | Holt |
| 2007/0174660 A1 | | 7/2007 | Peddada |
| 2007/0288828 A1 | | 12/2007 | Biran et al. |
| 2008/0072238 A1 | | 3/2008 | Monnie et al. |
| 2008/0189700 A1 | * | 8/2008 | Schmidt et al. ................. 718/1 |
| 2009/0116405 A1 | | 5/2009 | Hakala-Ranta et al. |

FOREIGN PATENT DOCUMENTS

| | | |
|---|---|---|
| EP | 0969377 | 1/2000 |
| WO | WO95/08809 | 3/1995 |
| WO | WO98/58330 | 12/1998 |
| WO | WO02/44835 | 6/2002 |
| WO | WO03/083614 | 10/2003 |
| WO | WO03/084116 | 10/2003 |
| WO | WO2005/103924 | 11/2005 |
| WO | WO2005/103925 | 11/2005 |
| WO | WO2005/103926 | 11/2005 |
| WO | WO2005/103927 | 11/2005 |
| WO | WO2005/103928 | 11/2005 |
| WO | WO2005/110937 | 10/2006 |
| WO | WO2006/110937 | 10/2006 |
| WO | WO2006/110957 | 10/2006 |

OTHER PUBLICATIONS

Bal et al., "Experience with Distributed Programming in Orca", *Proc. IEEE CS International Conference on Computer Languages*, pp. 79-89 (1990).

Bal et al., "Object Distribution in ORCA Using Compile-Time and Run_Time Techniques", Proc. Conference on Object-Oriented Programming Systems, Languages and Applications pp. 162-177 (1993).

Bal et al., "Orca: A Language for Paralell Programming of Distributed Systems", *IEEE Transactions on Software Engineering*, 18(3):190-205 (2002).

Bal et al., "Replication Techniques for Speeding up Parallel Applications on Distributed Sysytems", *Concurrency Practice & Experience*, 4(5):337-355 (1992).

Bressoud, T.C. TFT: "A Software System for Application-Transparent Fault Tolerance. Proc.", 28th Annual International Symposium on Fault-Tolerant Computing, pp. 128-137 (1998).

Abdullahi, et al., "Garbage Collection for Internet: A Survey of Distributed Garbage Collection", ACM Computing Surveys [Online], vol. 30, No. 3, Sep. 1998, pp. 330-373, XP002504741 ISSN:0360-0300 Retrieved from the Internet URL:http://portal.acm.org/citation.cfm?doid=292469.292471>.

Aridor, et al. "cJVM: a single System Image of a JVM on a Cluster" Proceedings of the International Conference on Parallel Processing, pp. 21-24, Sep. 21-24, 1999.

Bal, et al., "A Distributed Implementation of the Shared Data-Object Model", Proc. USENIX Workshop on Experiences with Distributed and Multiprocessor Systems pp. 1-19, Oct. 1998, Fort Lauderdale, FL.

Bal, et al., "Experience with Distributed Programming in Orca", *IEEE CS International Conference on Computer Languages*, pp. 1-23, Mar. 1990, New Orleans, Louisiana.

Bal, et al., "Object Distribution in ORCA Using Compile-Time and Run-Time Techniques", Proc. Conference on Object-Oriented Programming Systems, Languages and Applications pp. 162-177, Sep. 26, 1993-Oct. 1, 1993.

Bal, et al., "Orca: A Language for Paralell Programming of Distributed Systems", *IEEE Transactions on Software Engineering*, 18(3): pp. 1-33, Oct. 1989.

Bal, et al., "Replication Techniques for Speeding Up Parallel Applications On Distributed Systems", *Concurrency Practice & Experience*, 4(5):337-355 (1992).

Bellew, et al., "Update propagation in distributed memory hierarchy." Data Engr. 1990. Proc. 6th Int'l Conf., pp. 521-528, Feb. 1990.

Bennett, et al. "Munin: Distributed Shared Memory Based on Type Specific Memory Coherence." Dept. Elec & Computer Engr. pp. 1-9 ACM, PPOPP' 90, Feb. 1990.

Bressoud, T.C. TFT: "A Software System for Application-Transparent Fault Tolerance. Proc.", $28^{th}$ Annual International Symposium on Fault-Tolerant Computing, pp. 128-137, Jun. 1998, Munich, Germany.

Chen, et al., "Multi-Jav: a distributed shared memory system based on multiple Java virtual machines." Proc. Of Conf. on Parallel & Distrib. Proc. Techn. & Appls., Las Vegas, NV, Jun. 1998.

Dasilva, et al. "An evaluation of cJava system architecture." IEEE Prc. 15th Symposium on Computer Architecture & High Performance Computing, pp. 1-9, Nov. 10-12, 2003, San Paulo, Brazil.

Dmitriev, "Profiling Java applications using code hotswapping and dynamic call graph revelation.", Jan. 14-16, 2004, ACM WOSP '04, pp. 139-150.

Dwarkadas, et al., "Evaluation of Release Consistent Software Distributed Shared Memory on Emerging Network Technology", Proc of the 20th Annual International Symposium on Computer Architecture (ISCA'93), pp. 144-155, May 16-19, 1993, San Diego, CA.

Haumacher, et al. "Transparent distributed threads for Java," Parallel & Distributed Proc. Symposium 2003. Proc. Int'l. pp. 22-26, Apr. 2003.

Little, et al., "Maintaining Information About Persistent Replicated Objects in a Distributed System", Processing of the International Conference on Distributed Computing Systems. Pittsburgh, May 25-28, 1993 [Proceedings of the International Conference on Distributed Computing Systems], Los Alamitos, IEEE Comp Soc Press US, vol. CONF. 13, May 25, 1993, pp. 491-498, WP010095684 ISBN:978-0-8186-3770-4.

Radovic, et al., "Removing the overhead from software-based shared memory." Prc. 2001 ACM/IEEE Conf. Supercomputing (CDrom), Denver CO, Nov. 10-16, 2001, Supercomuting '01. ACM Press. NY.

Russ, et al. "The hector distributed run-time environment", IEEEE Transactions on Parallel and Distributed Systems, vol. 9, No. 111998, May 22, 1998.

Sanchez, et al. "Distributed Garbage Collection for Wide Area Replicated Memory", Proceedings of the 6th Conference on Usenix Conference on Object-Orientated Technologies and Systems [On Line], vol. 6, Jun. 29, 2001, pp. 1-14, P1-14XP002502672 Retrieved from the Internet URL:http://portal.acm.org/citation. cfm?id=1268246 http://citeseerx.ist.psu.edu/viewdoc/summary?doi=10.1.1.10.5675 http://www.gsd.inesc-id.pt/{veiga/papers/dgcwarm-coots-2001.pdf>.

Shapiro, et al., "A Distributed Shared Memory and its Garbage Collector", Lecture notes in Computer Science, vol. 972, Proceedings of the 9th International Workshop on Distributed Algorithms, pp. 198-214, Sep. 13-15, 1995.

M. Factor, A. Schuster, and K. Shagin., JavaSplit: A runtime for execution of monolithic java programs on heterogeneous collections of commodity workstations, 2003, In IEEE Fifth Int'l Conference on Cluster Computing.

Factor M., A. Schuster, and A. Shagin, K., "A distributed runtime for Java: yesterday and today", Parallel and Distributed Processing Symposium, 2004. Proceedings. 18th International, vol., No., pp. 159-, Apr. 26-30, 2004.

* cited by examiner

MACHINE | TABLE

| X1 | 1 | 2 | | | n |
|----|---|---|---|---|---|
| B | 1 | | | | |
| | | | | | |
| | | | | | |

M1

| X2 | 1 | 2 | | | n |
|----|---|---|---|---|---|
| D | | 2 | | | |
| | | | | | |
| | | | | | |

M2

| Xn | 1 | 2 | | | n |
|----|---|---|---|---|---|
| A | | | | | n |
| E | | | | | n |
| | | | | | |

MACHINE | TABLE

| X1 | 1 | 2 | | | n |
|---|---|---|---|---|---|
| A1 | 1 | 2 | | | n |
| B | 1 | | | | |
| | | | | | |

M1

| X2 | 1 | 2 | | | n |
|---|---|---|---|---|---|
| A2 | 1 | 2 | | | n |
| D | | 2 | | | |
| | | | | | |

M2

| Xn | 1 | 2 | | | n |
|---|---|---|---|---|---|
| An | 1 | 2 | | | n |
| E | | | | | n |
| | | | | | |

| MACHINE | TABLE |
|---|---|

| | | | | | |
|---|---|---|---|---|---|
| X1 | 1 | | | | n |
| A1 | 1 | | | | n |
| B | 1 | | | | |
| | | | | | |

M1

| | | | | | |
|---|---|---|---|---|---|
| X2 | 1 | | | | n |
| A2 | 1 | | | | n |
| D | | | | | |
| | | | | | |

M2

| | | | | | |
|---|---|---|---|---|---|
| Xn | 1 | | | | n |
| An | 1 | | | | n |
| E | | | | | n |
| | | | | | |

FAILURE RESISTANT MULTIPLE COMPUTER SYSTEM AND METHOD

CROSS-REFERENCE TO RELATED APPLICATIONS

This specification claims benefit of previously filed U.S. Provisional Application No. 60/730,512 entitled "Failure Resistant Multiple Computer System and Method" filed Oct. 25, 2005; which is hereby incorporated by reference.

FIELD OF THE INVENTION

The present invention relates to computing and, in particular, to the simultaneous operation of a plurality of computers interconnected via a communications network.

BACKGROUND ART

International Patent Application No. PCT/AU2005/000580 published under WO 2005/103926 (to which U.S. patent application Ser. No. 11/111,946 and published under No. 2005-0262313 corresponds) in the name of the present applicant, discloses how different portions of an application program written to execute on only a single computer can be operated substantially simultaneously on a corresponding different one of a plurality of computers. That simultaneous operation has not been commercially used as of the priority date of the present application. International Patent Application Nos. PCT/AU2005/001641 to which U.S. patent application Ser. No. 11/259,885 entitled: "Computer Architecture Method of Operation for Multi-Computer Distributed Processing and Co-ordinated Memory and Asset Handling" corresponds and PCT/AU2006/000532 in the name of the present applicant and unpublished as at the priority date of the present application, also disclose further details. The contents of each of the abovementioned prior application(s) are hereby incorporated into the present application by cross reference for all purposes.

Briefly stated, the abovementioned patent specifications disclose that at least one application program written to be operated on only a single computer can be simultaneously operated on a number of computers each with independent local memory. The memory locations required for the operation of that program are replicated in the independent local memory of each computer. On each occasion on which the application program writes new data to any replicated memory location, that new data is transmitted and stored at each corresponding memory location of each computer. Thus apart from the possibility of transmission delays, each computer has a local memory the contents of which are substantially identical to the local memory of each other computer and are updated to remain so. Since all application programs, in general, read data much more frequently than they cause new data to be written, the abovementioned arrangement enables very substantial advantages in computing speed to be achieved. In particular, the stratagem enables two or more commodity computers interconnected by a commodity communications network to be operated simultaneously running under the application program written to be executed on only a single computer.

In many situations, the above-mentioned arrangements work satisfactorily. This applies particularly where the programmer is aware that there may be updating delays and so can adjust the flow of the program to account for this. However, there are situations in which the use of stale contents or values instead of the latest content can create problems.

The genesis of the present invention is a desire to at least partially overcome the abovementioned difficulty.

SUMMARY OF THE INVENTION

In accordance with a first aspect of the present invention there is disclosed a failure resistant method of operating a plurality of computers each with their corresponding independent local memory, each simultaneously operating an application program, and each being connected via a communications network to permit updating of corresponding memory locations, said method comprising the steps of:

(i) categorizing the memory locations of said local memories into a first reachability category in which the local memory locations are accessible by selected ones, or all, of said computers and therefore require updating via said communications network with changes to corresponding memory locations of the other computers having access to maintain substantial memory coherence, and into a second category in which the local memory locations are accessible only by the local computer and therefore no updating is required, (ii) detecting failure of any one of said multiple computers, and (iii) modifying said first category to remove therefrom, if present, reference to accessibility by the failed computer, whereby no attempt is made to update any first category locations of said failed computer.

In accordance with a second aspect of the present invention there is disclosed a failure resistant multiple computer system in which a plurality of computers each has a corresponding independent local memory, each simultaneously operates a corresponding portion of an application program written to be executed only on a single computer, and each is connected via a communications network to permit updating of corresponding memory locations, said system including a reachability means to categorize memory locations of said local memories into a first category in which the local memory locations are replicated in selected ones, or all, of said computers and therefore require updating via said communications network with changes to corresponding memory locations of other computers, to maintain substantial memory coherence, and into a second category in which the local memory locations are present only in the local computer and therefore no updating is required, and wherein said system further includes a failure detection means connected to each said computer to detect failure of any one of said multiple computers, and a reachability modifier connected to said failure connection means and to said reachability means to modify said reachability means by modifying said first category to remove therefrom, if present, any reference by the failed computer whereby no attempt is made to update any first category memory locations of said failed computer.

In accordance with a third aspect of the present invention there is disclosed a computer program product comprising a set of program instructions stored in a storage medium and operable to permit a plurality of computers to carry out the abovementioned method.

In accordance with a fourth aspect of the present invention there is disclosed a plurality of computers interconnected via a communications network and operable to ensure carrying out the abovementioned method.

In accordance with a fifth aspect of the present invention there is disclosed a single computer adapted to co-operate with at least one other computer to carry out the above method or form the above computer system.

BRIEF DESCRIPTION OF THE DRAWINGS

Preferred embodiments of the present invention will now be described with reference to the drawings in which:

FIG. 5 shows multiple reachability tables equivalent to FIG. 4, FIG. 8 shows the multiple reachability tables corresponding to FIG. 6, FIG. 13 shows the multiple reachability tables in the circumstance of FIG. 11.

DETAILED DESCRIPTION

The embodiments will be described with reference to the JAVA language, however, it will be apparent to those skilled in the art that the invention is not limited to this language and, in particular can be used with other languages (including procedural, declarative and object oriented languages) including the MICROSOFT.NET platform and architecture (Visual Basic, Visual C, and Visual C++, and Visual C#), FORTRAN, C, C++, COBOL, BASIC and the like.

Figure 1A:
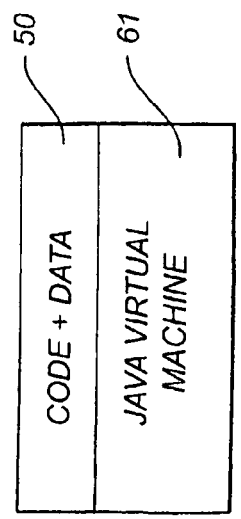
FIG. 1A is a schematic illustration of a prior art computer arranged to operate JAVA code and thereby constitute a single JAVA virtual machine.

It is known in the prior art to provide a single computer or machine (produced by any one of various manufacturers and having an operating system (or equivalent control software or other mechanism) operating in any one of various different languages) utilizing the particular language of the application by creating a virtual machine as illustrated in FIG. 1A.

The code and data and virtual machine configuration or arrangement of FIG. 1A takes the form of the application code 50 written in the JAVA language and executing within the JAVA virtual machine 61. Thus where the intended language of the application is the language JAVA, a JAVA virtual machine is used which is able to operate code in JAVA irrespective of the computer or machine manufacturer and internal details of the computer or machine. For further details, see "The JAVA Virtual Machine Specification" $2^{nd}$ Edition by T. Lindholm and F. Yellin of Sun Microsystems Inc of the USA which is incorporated herein by reference.

Figure 1B:
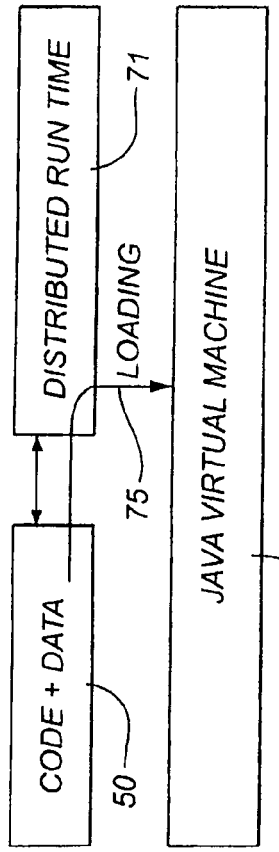
FIG. 1B is a drawing similar to FIG. 1A but illustrating the initial loading of code.

This conventional art arrangement of FIG. 1A is modified in accordance with embodiments of the present invention by the provision of an additional facility which is conveniently termed a "distributed run time" or a "distributed run time system" DRT 71 and as seen in FIG. 1B.

Figure 1C:
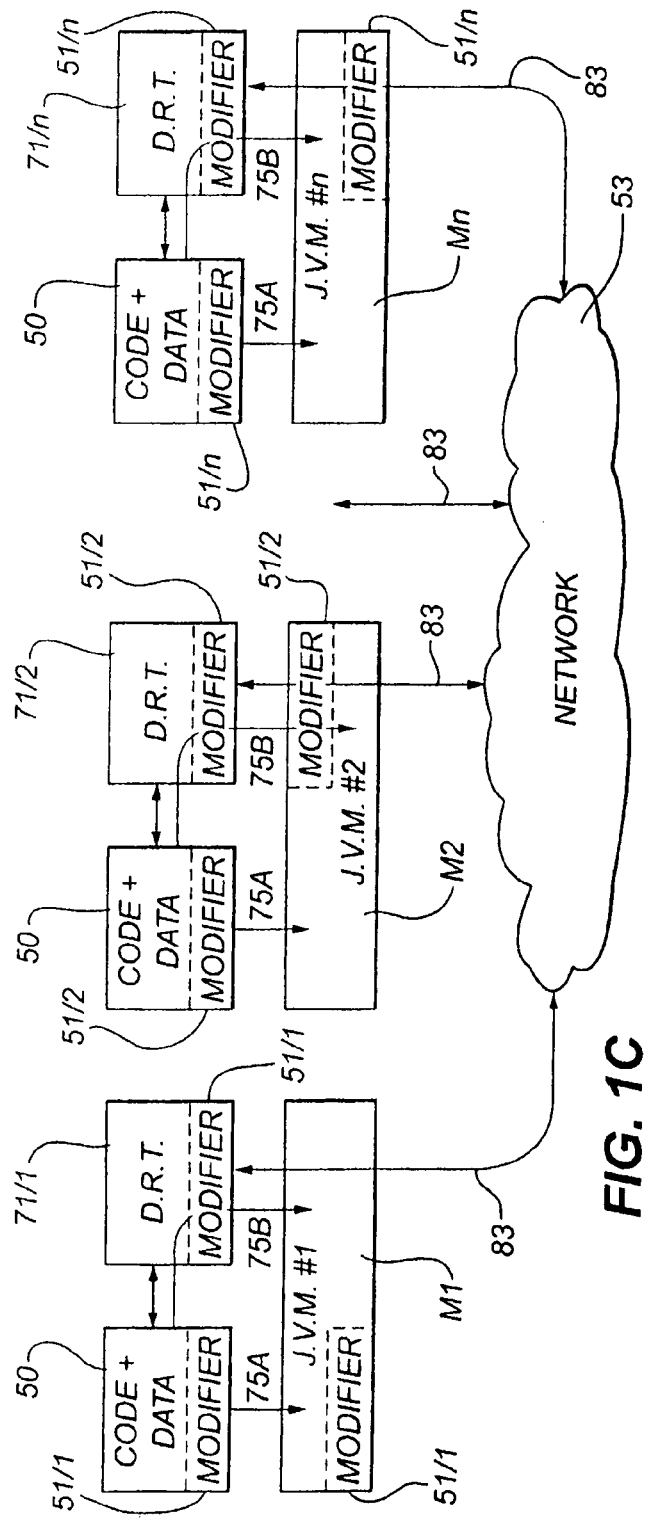
FIG. 1C illustrates the interconnection of a multiplicity of computers each being a JAVA virtual machine to form a multiple computer system, FIG. 2 schematically illustrates "n" application running computers to which at least one additional server machine X is connected as a server.

In FIGS. 1B and 1C, the application code 50 is loaded onto the Java Virtual Machine(s) M1, M2, . . . Mn in cooperation with the distributed runtime system 71, through the loading procedure indicated by arrow 75 or 75A or 75B. As used herein the terms "distributed runtime" and the "distributed run time system" are essentially synonymous, and by means of illustration but not limitation are generally understood to include library code and processes which support software written in a particular language running on a particular platform. Additionally, a distributed runtime system may also include library code and processes which support software written in a particular language running within a particular distributed computing environment. A runtime system (whether a distributed runtime system or not) typically deals with the details of the interface between the program and the operating system such as system calls, program start-up and termination, and memory management. For purposes of background, a conventional Distributed Computing Environment (DCE) (that does not provide the capabilities of the inventive distributed run time or distributed run time system 71 used in the preferred embodiments of the present invention) is available from the Open Software Foundation. This Distributed Computing Environment (DCE) performs a form of computer-to-computer communication for software running on the machines, but among its many limitations, it is not able to implement the desired modification or communication operations. Among its functions and operations the preferred DRT 71 coordinates the particular communications between the plurality of machines M1, M2, . . . Mn. Moreover, the preferred distributed runtime 71 comes into operation during the loading procedure indicated by arrow 75A or 75B of the JAVA application 50 on each JAVA virtual machine 72 or machines JVM#1, JVM#2, . . . JVM#n of FIG. 1C. It will be appreciated in light of the description provided herein that although many examples and descriptions are provided relative to the JAVA language and JAVA virtual machines so that the reader may get the benefit of specific examples, the invention is not restricted to either the JAVA language or JAVA virtual machines, or to any other language, virtual machine, machine or operating environment.

FIG. 1C shows in modified form the arrangement of the JAVA virtual machines, each as illustrated in FIG. 1B. It will be apparent that again the same application code 50 is loaded onto each machine M1, M2 . . . Mn. However, the communications between each machine M1, M2 . . . Mn are as indicated by arrows 83, and although physically routed through the machine hardware, are advantageously controlled by the individual DRT's 71/1 . . . 71/n within each machine. Thus, in practice this may be conceptionalised as the DRT's 71/1, . . . 71/n communicating with each other via the network or other communications link 53 rather than the machines M1, M2 . . . Mn communicating directly themselves or with each other. Contemplated and included are either this direct communication between machines M1, M2 . . . Mn or DRT's 71/1, 71/2 . . . 71/n or a combination of such communications. The preferred DRT 71 provides communication that is transport, protocol, and link independent.

The one common application program or application code 50 and its executable version (with likely modification) is simultaneously or concurrently executing across the plurality of computers or machines M1, M2 . . . Mn. The application program 50 is written to execute on a single machine or computer (or to operate on the multiple computer system of the abovementioned patent applications which emulate single computer operation). Essentially the modified structure is to replicate an identical memory structure and contents on each of the individual machines.

The term "common application program" is to be understood to mean an application program or application program code written to operate on a single machine, and loaded and/or executed in whole or in part on each one of the plurality of computers or machines M1, M2 . . . Mn, or optionally on each one of some subset of the plurality of computers or machines M1, M2 . . . Mn. Put somewhat differently, there is a common application program represented in application code 50. This is either a single copy or a plurality of identical copies each individually modified to generate a modified copy or version of the application program or program code. Each copy or instance is then prepared for execution on the corresponding machine. At the point after they are modified they are common in the sense that they perform similar operations and operate consistently and coherently with each other. It will be appreciated that a plurality of computers, machines, information appliances, or the like implementing embodiments of the invention may optionally be connected to or coupled with other computers, machines, information appliances, or the like that do not implement embodiments of the invention.

The same application program 50 (such as for example a parallel merge sort, or a computational fluid dynamics application or a data mining application) is run on each machine, but the executable code of that application program is modified on each machine as necessary such that each executing instance (copy or replica) on each machine coordinates its local operations on that particular machine with the operations of the respective instances (or copies or replicas) on the other machines such that they function together in a consistent, coherent and coordinated manner and give the appearance of being one global instance of the application (i.e. a "meta-application").

The copies or replicas of the same or substantially the same application codes, are each loaded onto a corresponding one of the interoperating and connected machines or computers. As the characteristics of each machine or computer may differ, the application code 50 may be modified before loading, or during the loading process, or with some disadvantages after the loading process, to provide a customization or modification of the application code on each machine. Some dissimilarity between the programs or application codes on the different machines may be permitted so long as the other requirements for interoperability, consistency, and coherency as described herein can be maintained. As it will become apparent hereafter, each of the machines M1, M2 . . . Mn and thus all of the machines M1, M2 . . . Mn have the same or substantially the same application code 50, usually with a modification that may be machine specific.

Before the loading of, or during the loading of, or at any time preceding the execution of, the application code 50 (or the relevant portion thereof) on each machine M1, M2 . . . Mn, each application code 50 is modified by a corresponding modifier 51 according to the same rules (or substantially the same rules since minor optimizing changes are permitted within each modifier 51/1, 51/2 . . . 51/n).

Each of the machines M1, M2 . . . Mn operates with the same (or substantially the same or similar) modifier 51 (in some embodiments implemented as a distributed run time or DRT71 and in other embodiments implemented as an adjunct to the application code and data 50, and also able to be implemented within the JAVA virtual machine itself). Thus all of the machines M1, M2 . . . Mn have the same (or substantially the same or similar) modifier 51 for each modification required. A different modification, for example, may be required for memory management and replication, for initialization, for finalization, and/or for synchronization (though not all of these modification types may be required for all embodiments).

There are alternative implementations of the modifier 51 and the distributed run time 71. For example, as indicated by broken lines in FIG. 1C, the modifier 51 may be implemented as a component of or within the distributed run time 71, and therefore the DRT 71 may implement the functions and operations of the modifier 51. Alternatively, the function and operation of the modifier 51 may be implemented outside of the structure, software, firmware, or other means used to implement the DRT 71 such as within the code and data 50, or within the JAVA virtual machine itself. In one embodiment, both the modifier 51 and DRT 71 are implemented or written in a single piece of computer program code that provides the functions of the DRT and modifier. In this case the modifier function and structure is, in practice, subsumed into the DRT. Independent of how it is implemented, the modifier function and structure is responsible for modifying the executable code of the application code program, and the distributed run time function and structure is responsible for implementing communications between and among the computers or machines. The communications functionality in one embodiment is implemented via an intermediary protocol layer within the computer program code of the DRT on each machine. The DRT can, for example, implement a communications stack in the JAVA language and use the Transmission Control Protocol/Internet Protocol (TCP/IP) to provide for communications or talking between the machines. These functions or operations may be implemented in a variety of ways, and it will be appreciated in light of the description provided herein that exactly how these functions or operations are implemented or divided between structural and/or procedural elements, or between computer program code or data structures, is not important or crucial to the invention.

However, in the arrangement illustrated in FIG. 1C, a plurality of individual computers or machines M1, M2 . . . Mn are provided, each of which are interconnected via a communications network 53 or other communications link. Each individual computer or machine is provided with a corresponding modifier 51. Each individual computer is also provided with a communications port which connects to the communications network. The communications network 53 or path can be any electronic signalling, data, or digital communications network or path and is preferably a slow speed, and thus low cost, communications path, such as a network connection over the Internet or any common networking configurations including ETHERNET or INFINIBAND and extensions and improvements, thereto. Preferably, the computers are provided with one or more known communications ports (such as CISCO Power Connect 5224 Switches) which connect with the communications network 53.

As a consequence of the above described arrangement, if each of the machines M1, M2, . . . , Mn has, say, an internal or local memory capability of 10 MB, then the total memory available to the application code 50 in its entirety is not, as one might expect, the number of machines (n) times 10 MB. Nor is it the additive combination of the internal memory capability of all n machines. Instead it is either 10 MB, or some number greater than 10 MB but less than n×10 MB. In the situation where the internal memory capacities of the machines are different, which is permissible, then in the case where the internal memory in one machine is smaller than the internal memory capability of at least one other of the machines, then the size of the smallest memory of any of the machines may be used as the maximum memory capacity of the machines when such memory (or a portion thereof) is to be treated as 'common' memory (i.e. similar equivalent memory on each of the machines M1 . . . Mn) or otherwise used to execute the common application code.

However, even though the manner that the internal memory of each machine is treated may initially appear to be a possible constraint on performance, how this results in improved operation and performance will become apparent hereafter. Naturally, each machine M1, M2 . . . Mn has a private (i.e. 'non-common') internal memory capability. The private internal memory capability of the machines M1, M2, . . . , Mn are normally approximately equal but need not be. For example, when a multiple computer system is implemented or organized using existing computers, machines, or information appliances, owned or operated by different entities, the internal memory capabilities may be quite different. On the other hand, if a new multiple computer system is being implemented, each machine or computer is preferably selected to have an identical internal memory capability, but this need not be so.

It is to be understood that the independent local memory of each machine represents only that part of the machine's total memory which is allocated to that portion of the application program running on that machine. Thus, other memory will be occupied by the machine's operating system and other computational tasks unrelated to the application program 50.

Non-commercial operation of a prototype multiple computer system indicates that not every machine or computer in the system utilises or needs to refer to (e.g. have a local replica of) every possible memory location. As a consequence, it is possible to operate a multiple computer system without the local memory of each machine being identical to every other machine, so long as the local memory of each machine is sufficient for the operation of that machine. That is to say, provided a particular machine does not need to refer to (for example have a local replica of) some specific memory locations, then it does not matter that those specific memory locations are not replicated in that particular machine.

It may also be advantageous to select the amounts of internal memory in each machine to achieve a desired performance level in each machine and across a constellation or network of connected or coupled plurality of machines, computers, or information appliances M1, M2, . . . , Mn. Having described these internal and common memory considerations, it will be apparent in light of the description provided herein that the amount of memory that can be common between machines is not a limitation.

In some embodiments, some or all of the plurality of individual computers or machines can be contained within a single housing or chassis (such as so-called "blade servers" manufactured by Hewlett-Packard Development Company, Intel Corporation, IBM Corporation and others) or the multiple processors (eg symmetric multiple processors or SMPs) or multiple core processors (eg dual core processors and chip multithreading processors) manufactured by Intel, AMD, or others, or implemented on a single printed circuit board or even within a single chip or chip set. Similarly, also included are computers or machines having multiple cores, multiple CPU's or other processing logic.

When implemented in a non-JAVA language or application code environment, the generalized platform, and/or virtual machine and/or machine and/or runtime system is able to operate application code 50 in the language(s) (possibly including for example, but not limited to any one or more of source-code languages, intermediate-code languages, object-code languages, machine-code languages, and any other code languages) of that platform and/or virtual machine and/or machine and/or runtime system environment, and utilize the platform, and/or virtual machine and/or machine and/or runtime system and/or language architecture irrespective of the machine or processor manufacturer and the internal details of the machine. It will also be appreciated that the platform and/or runtime system can include virtual machine and non-virtual machine software and/or firmware architectures, as well as hardware and direct hardware coded applications and implementations.

For a more general set of virtual machine or abstract machine environments, and for current and future computers and/or computing machines and/or information appliances or processing systems, and that may not utilize or require utilization of either classes and/or objects, the inventive structure, method and computer program and computer program product are still applicable. Examples of computers and/or computing machines that do not utilize either classes and/or objects include for example, the ×86 computer architecture manufactured by Intel Corporation and others, the SPARC computer architecture manufactured by Sun Microsystems, Inc and others, the Power PC computer architecture manufactured by International Business Machines Corporation and others, and the personal computer products made by Apple Computer, Inc., and others.

For these types of computers, computing machines, information appliances, and the virtual machine or virtual computing environments implemented thereon that do not utilize the idea of classes or objects, may be generalized for example to include primitive data types (such as integer data types, floating point data types, long data types, double data types, string data types, character data types and Boolean data types), structured data types (such as arrays and records), derived types, or other code or data structures of procedural languages or other languages and environments such as functions, pointers, components, modules, structures, reference and unions. These structures and procedures when applied in combination when required, maintain a computing environment where memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

This analysis or scrutiny of the application code 50 can take place either prior to loading the application program code 50, or during the application program code 50 loading procedure, or even after the application program code 50 loading procedure (or some combination of these). It may be likened to an instrumentation, program transformation, translation, or compilation procedure in that the application code can be instrumented with additional instructions, and/or otherwise modified by meaning-preserving program manipulations, and/or optionally translated from an input code language to a different code language (such as for example from source-code language or intermediate-code language to object-code language or machine-code language). In this connection it is understood that the term compilation normally or conventionally involves a change in code or language, for example, from source code to object code or from one language to another language. However, in the present instance the term "compilation" (and its grammatical equivalents) is not so restricted and can also include or embrace modifications within the same code or language. For example, the compilation and its equivalents are understood to encompass both ordinary compilation (such as for example by way of illustration but not limitation, from source-code to object code), and compilation from source-code to source-code, as well as compilation from object-code to object code, and any altered combinations therein. It is also inclusive of so-called "intermediary-code languages" which are a form of "pseudo object-code".

By way of illustration and not limitation, in one embodiment, the analysis or scrutiny of the application code 50 takes place during the loading of the application program code such as by the operating system reading the application code 50 from the hard disk or other storage device, medium or source and copying it into memory and preparing to begin execution of the application program code. In another embodiment, in a JAVA virtual machine, the analysis or scrutiny may take place during the class loading procedure of the java.lang.ClassLoader.loadClass method (e.g. "java.lang.ClassLoader.loadClass( )").

Alternatively, or additionally, the analysis or scrutiny of the application code 50 (or of a portion of the application code) may take place even after the application program code loading procedure, such as after the operating system has loaded the application code into memory, or optionally even after execution of the relevant corresponding portion of the application program code has started, such as for example after the JAVA virtual machine has loaded the application code into the virtual machine via the "java.lang.ClassLoader.loadClass( )" method and optionally commenced execution.

Persons skilled in the computing arts will be aware of various possible techniques that may be used in the modification of computer code, including but not limited to instrumentation, program transformation, translation, or compilation means and/or methods.

One such technique is to make the modification(s) to the application code, without a preceding or consequential change of the language of the application code. Another such technique is to convert the original code (for example, JAVA language source-code) into an intermediate representation (or intermediate-code language, or pseudo code), such as JAVA byte code. Once this conversion takes place the modification is made to the byte code and then the conversion may be reversed. This gives the desired result of modified JAVA code.

A further possible technique is to convert the application program to machine code, either directly from source-code or via the abovementioned intermediate language or through some other intermediate means. Then the machine code is modified before being loaded and executed. A still further such technique is to convert the original code to an intermediate representation, which is thus modified and subsequently converted into machine code.

The present invention encompasses all such modification routes and also a combination of two, three or even more, of such routes.

The DRT 71 or other code modifying means is responsible for creating or replicating a memory structure and contents on each of the individual machines M1, M2 . . . Mn that permits the plurality of machines to interoperate. In some embodiments this replicated memory structure will be identical. Whilst in other embodiments this memory structure will have portions that are identical and other portions that are not. In still other embodiments the memory structures are different only in format or storage conventions such as Big Endian or Little Endian formats or conventions.

These structures and procedures when applied in combination when required, maintain a computing environment where the memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

Therefore the terminology "one", "single", and "common" application code or program includes the situation where all machines M1, M2 . . . Mn are operating or executing the same program or code and not different (and unrelated) programs, in other words copies or replicas of same or substantially the same application code are loaded onto each of the interoperating and connected machines or computers.

In conventional arrangements utilising distributed software, memory access from one machine's software to memory physically located on another machine typically takes place via the network interconnecting the machines. Thus, the local memory of each machine is able to be accessed by any other machine and can therefore cannot be said to be independent. However, because the read and/or write memory access to memory physically located on another computer-require the use of the slow network interconnecting the computers, in these configurations such memory accesses can result in substantial delays in memory read/write processing operations, potentially of the order of $10^6$-$10^7$ cycles of the central processing unit of the machine (given contemporary processor speeds). Ultimately this delay is dependent upon numerous factors, such as for example, the speed, bandwidth, and/or latency of the communication network. This in large part accounts for the diminished performance of the multiple interconnected machines in the prior art arrangement.

However, in the present arrangement all reading of memory locations or data is satisfied locally because a current value of all (or some subset of all) memory locations is stored on the machine carrying out the processing which generates the demand to read memory.

Similarly, all writing of memory locations or data is satisfied locally because a current value of all (or some subset of all) memory locations is stored on the machine carrying out the processing which generates the demand to write to memory.

Such local memory read and write processing operation can typically be satisfied within $10^2$-$10^3$ cycles of the central processing unit. Thus, in practice there is substantially less waiting for memory accesses which involves and/or writes. Also, the local memory of each machine is not able to be accessed by any other machine and can therefore be said to be independent.

The invention is transport, network, and communications path independent, and does not depend on how the communication between machines or DRTs takes place. In one embodiment, even electronic mail (email) exchanges between machines or DRTs may suffice for the communications.

Figure 2:
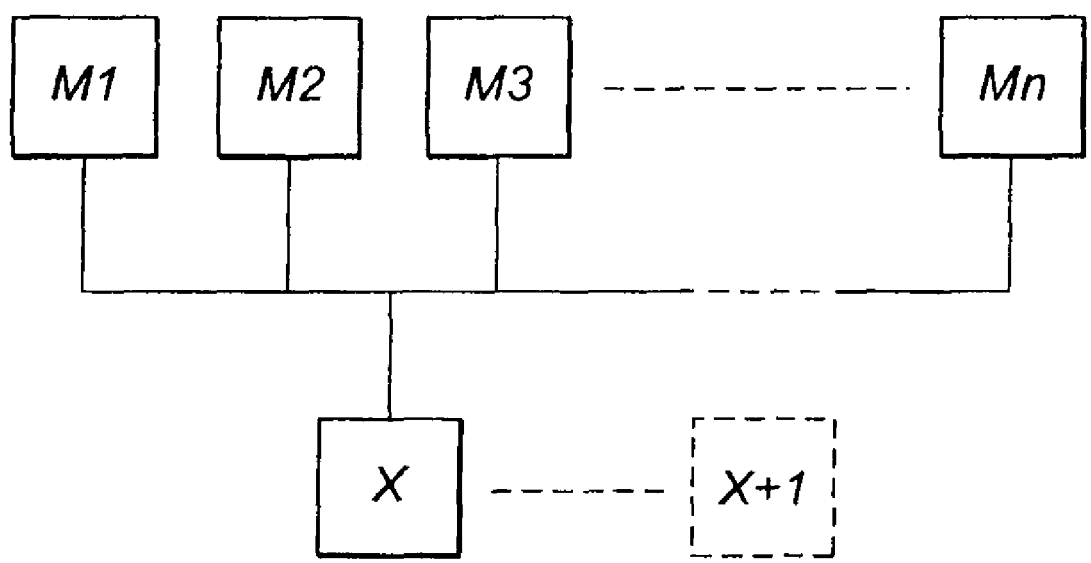

In connection with the above, it will be seen from FIG. 2 that there are a number of machines M1, M2, . . . Mn, "n" being an integer greater than or equal to two, on which the application program 50 of FIG. 1 is being run substantially simultaneously. These machines are allocated a number 1, 2, 3, . . . etc. in a hierarchical order. This order is normally looped or closed so that whilst machines 2 and 3 are hierarchically adjacent, so too are machines "n" and 1. There is preferably a further machine X which is provided to enable various housekeeping functions to be carried out, such as acting as a lock server. In particular, the further machine X can be a low value machine, and much less expensive than the other machines which can have desirable attributes such as processor speed. Furthermore, an additional low value machine (X+1) is preferably available to provide redundancy in case machine X should fail. Where two such server machines X and X+1 are provided, they are preferably, for reasons of simplicity, operated as dual machines in a cluster configuration. Machines X and X+1 could be operated as a multiple computer system in accordance with the present invention, if desired. However this would result in generally undesirable complexity. If the machine X is not provided then its functions, such as housekeeping functions, are provided by one, or some, or all of the other machines.

Figures 3, 4:
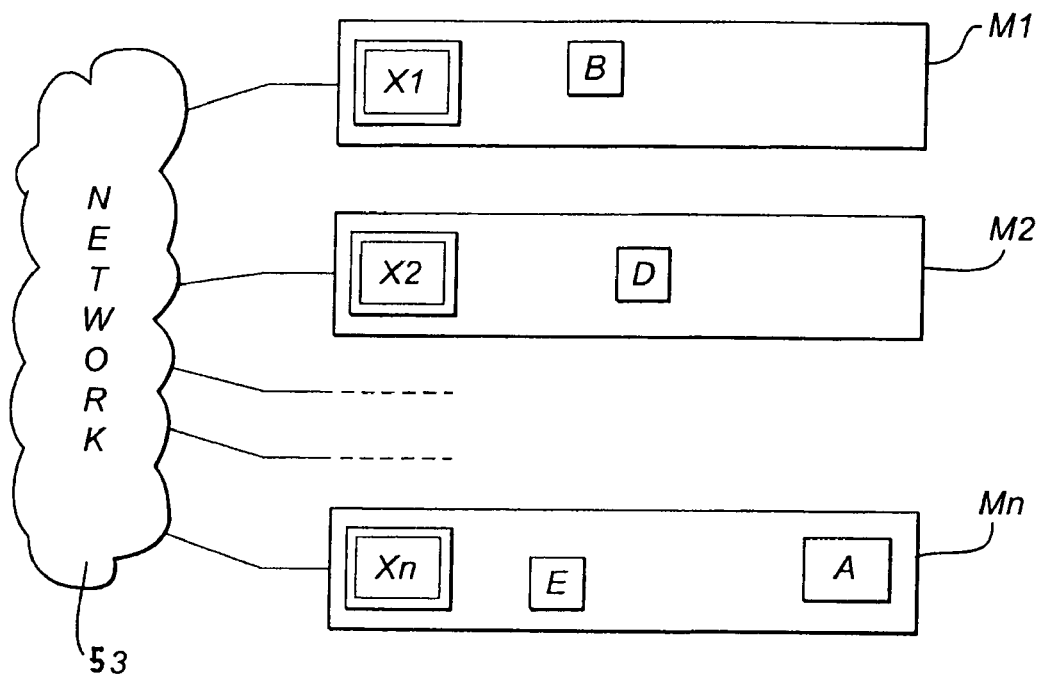
FIG. 3 is a schematic map of the memory locations in all the multiple machines showing memory locations including classes and objects.
FIG. 4 is a single reachability table showing the various memory locations of FIG. 3 and their ability to be reached.

Turning now to FIG. 3, each of the multiple machines M1, M2 . . . Mn (other than any server machine X if present) has its memory locations schematically illustrated. For machine M1 there is a class X1 and an object B. For machine M2 there is a class X2 which is the same as for machine M1, and an object D. For machine Mn there is the same class Xn and two objects A and E. The contents of the memory location X are the same for each of the machines and each machine is able to both read from, and write to, memory location X. For this reason, the boundary of memory location X is indicated with a double line.

Preferably, it is convenient for the server machine X of FIG. 2, to maintain a table listing each memory location and the machines which are able to access each memory location in the table. Such a table is said to be a reachability table and is illustrated in FIG. 4. The first row in the table of FIG. 4 deals with memory location A which is only able to be accessed by machine Mn. The second row in the table of FIG. 4 deals with memory location B which is only able to be accessed by machine M1. Similarly, object D is only able to be accessed by machine M2 and object E is only able to be accessed by machine Mn. However, the class X is able to be accessed by all of the machines M1, M2 and Mn.

The single reachability table of FIG. 4 is preferably located in, and maintained by, the server machine X. However, it is also possible for the computer system to be operated without a server machine X in which case it is desirable for each machine to operate its own reachability table. FIG. 5 illustrates individual reachability tables for the individual machines in the circumstances corresponding to FIG. 4.

Thus, in FIG. 5 the table for machine M1 has a row for class X and a row for object B. Similarly, the table for machine M2 has a row for class X and a row for object D. However, the table for machine Mn has three rows, one for class X, and one for each of objects A and E.

In the multi-machine environment described above, in the event that the content of class X is changed by being written to by one of the machines, then it is necessary to transmit that change in content via the network 53 to all the other machines. However, since the objects A, B, D and E are each are only able to be accessed by a single machine, there is little point in either creating or updating the contents of these memory locations since they are only able to be accessed by their local machine.

Figures 6, 7:
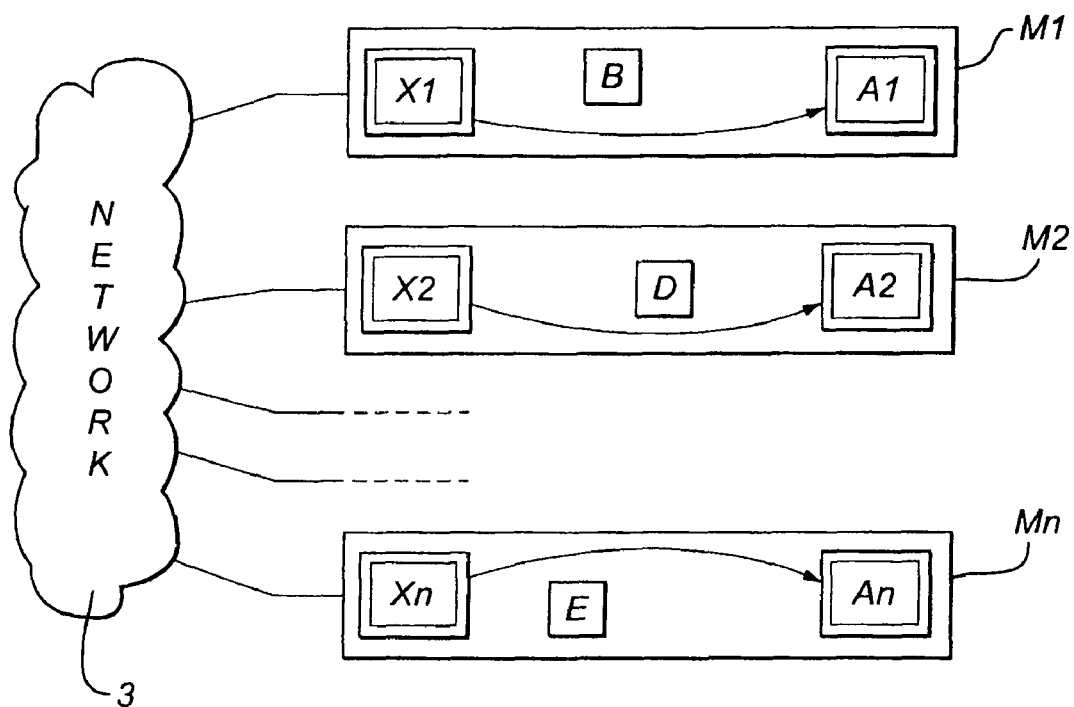
FIG. 6 is a map similar to FIG. 3 and showing memory location X pointing to memory location A.
FIG. 7 is the single reachability table corresponding to FIG. 6.

If now during the processing carried out by a particular machine, say machine Mn, the class Xn needs to refer to the object A, then class Xn is said to point to object A. This is indicated in FIG. 6 by an arrow pointing from class Xn to object A. The change in status of object A means that it is now able to be accessed or referenced by all the other machines. For this reason in FIG. 5 it is named object An, is bounded by double lines, and is reproduced in each of the other machines as object A1, A2, etc. Furthermore, an arrow points from each corresponding class X1, X2, etc. to the corresponding referred object A1, A2, etc. As a result of this change of status of object A, the first row of the reachability table of FIG. 4 is amended as illustrated in FIG. 7 so as to indicate that object A is now able to be reached by the machines M1, M2 and Mn. The server machine X of FIG. 2 uses the amended reachability table of FIG. 7 to ensure that the contents of object A, if amended by one machine, are transmitted via the network 53 to all the other machines.

Similarly, for the situation where multiple reachability tables are used, when the change illustrated by comparison of FIGS. 3 and 6 takes place, since class Xn now refers to object An, and thus all the other classes X1, X2, etc must now refer to corresponding objects A1, A2, etc. so all machines must now include a row in their reachability table for object A. This is the situation illustrated in FIG. 8. The other machines are said to inherit the table entry for object A.

The abovementioned detailed description refers to memory locations, however, it is equally applicable to structures, assets or resources (which in JAVA are termed classes or objects). These will have already been allocated a (global) name or tag which can be used globally by all machines (since it is understood that the local memory structure of different machines may be different). Thus the local or actual name allocated to a specific memory location in one machine may well be different from the local name allocated to the corresponding memory location in another machine. This global name allocation preferably happens during a compilation process at loading when the classes or objects are originally initialized. This is most conveniently done via a table maintained by the server machine X. This table can also include the reachability data.

It will be apparent to those skilled in the art that the reachability data enables structures, assets or resources (ie memory locations) to be divided into two categories or classes. The first category consists of those locations which are able to be accessed by all machines. It is necessary that write actions carried out in respect of such memory locations be distributed to all machines so that all corresponding memory locations have the same content (except for delays due to transmission of updating data). However, in respect of the second category, since these memory locations are only accessible by the local machine, write actions to these memory locations need not be distributed to all the other machines, nor need there be corresponding memory locations on the other machines. As a consequence of this categorisation, a substantial volume of data is not required to be transmitted from one machine to the others and so the volume of traffic on the network 53 is substantially reduced.

Machine Mn can determine that object A requires replication across the other machines by consulting the table entry for class X on machine Mn. In the situation illustrated, machine Mn makes a positive determination for replication by comparing the table entries for object A and class X. If the table entry for object A includes all machines in the table entry for class X, then machine Mn can correctly determine that object A does not need to be replicated on any other machines and, additionally, no table entries need to be added to, or updated on, other machines. Alternatively, if the table entry of object A does not include the full set of machines in the table entry of class X then machine Mn updates the table entry for object A to include the set of machines listed in the table entry for class X, and additionally instructs all machines listed in the new table entry for object A to update their local tables for object A with the set of machines listed in the new table entry for object A on machine Mn. Finally, for the set of machines which were not already present in the table entry for object A on machine Mn prior to the inheritance of the set of machines of class X on machine Mn, machine Mn instructs those machines (ie machines M1 and M2) to add a local table entry for object A and create local replicas in memory of object A and associated references to class X.

In addition to reducing the volume of data required to be transmitted via the network 53, the abovementioned categorization and reachability table(s) also provide an advantage in the event of failure of one of the computers. This is that the entire system does not fail. Instead the system is able to recover.

To continue the above example, suppose that in the memory condition illustrated in FIG. 6, machine M2, say, fails (for example due to failure of its power supply, CPU, failure of its link to the network 53 or similar catastrophic failure). This failure is able to detected by a conventional detector attached to each of the application program running machines and reporting to machine X, for example.

Such a detector is commercially available as a Simple Network Management Protocol (SNMP). This is essentially a small program which operates in the background and provides a specified output signal in the event that failure is detected.

Such a detector is able to sense failure in a number of ways, any one, or more, of which can be used simultaneously. For example, machine X can interrogate each of the other machines M1, . . . Mn in turn requesting a reply. If no reply is forthcoming after a predetermined time, or after a small number of "reminders" are sent, also without reply, the non-responding machine is pronounced "dead".

Alternatively, or additionally, each of the machines M1, . . . Mn can at regular intervals, say every 30 seconds, send a predetermined message to machine X (or to all other machines in the absence of a server) to say that all is well. In the absence of such a message the machine can be presumed "dead" or can be interrogated (and if it then fails to respond) is pronounced "dead".

Further methods include looking for a turn on event in an uninterruptible power supply (UPS) used to power each machine which therefore indicates a failure of mains power. Similarly conventional switches such as those manufactured by CISCO of California, USA include a provision to check either the presence of power to the communications network 53, or whether the network cable is disconnected.

In some circumstances, for example for enhanced redundancy or for increased bandwidth, each individual machine can be "multi-peered" which means there are two or more links between the machine and the communications network 53. An SNMP product which provides two options in this circumstance—namely wait for both/all links to fail before signalling machine failure, or signal machine failure if any one link fails, is the 12 Port Gigabit Managed Switch GSM 7212 sold under the trade marks NETGEAR and PROSAFE.

Figure 9:
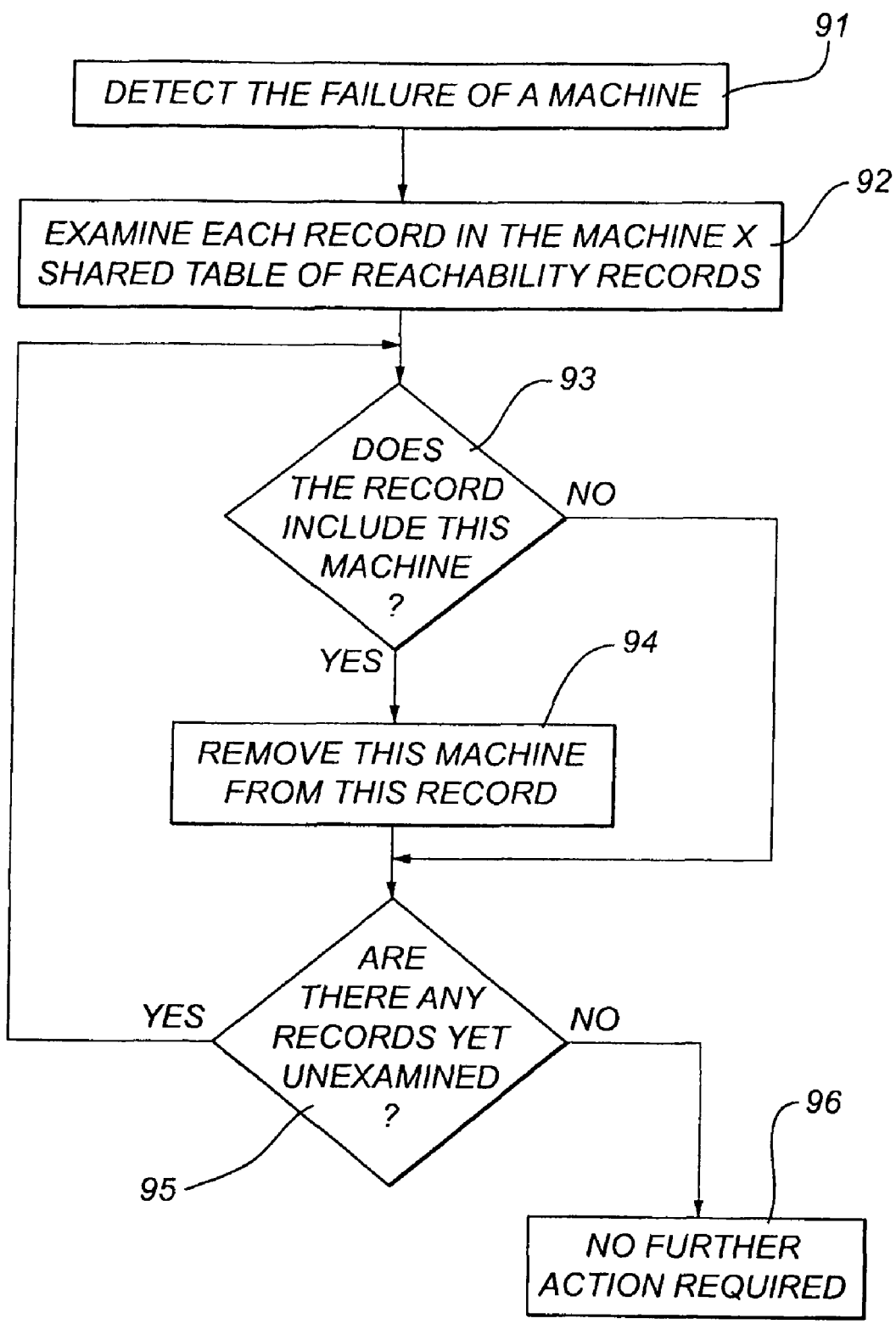
FIG. 9 is a flow chart showing one embodiment of the procedure to be undertaken in the event of failure of one of the n application running computers.

In the event that machine failure is detected, the procedures illustrated in FIG. 9 then come into operation. Step 91 in FIG. 9 is triggered by the detection of machine failure (for machine M2 in this example). As a consequence, machine X examines each record (or row) in its reachability table in turn as indicated at step 92. For each record the question of step 93 is asked to determine if the record in question refers to failed machine M2. If it does, at step 94 the reference to failed machine M2 is removed from the row, and then step 95 is commenced. If it does not, step 95 is commenced immediately.

As indicated in FIG. 9, at step 95 any remaining record or row in the table is then subjected to step 93 until eventually all records have been interrogated and thus no further action is required as indicated at step 96.

Figure 10:
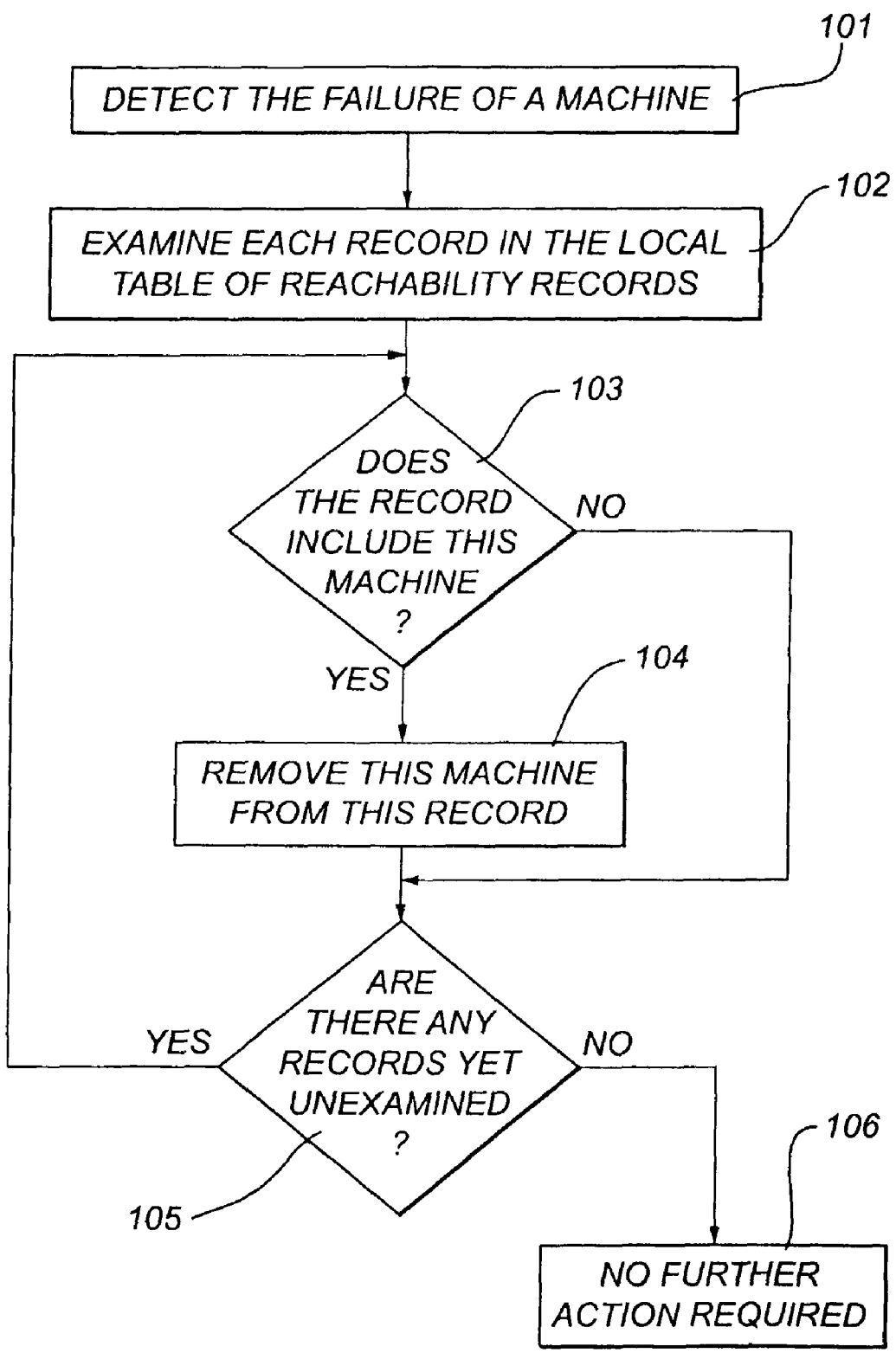
FIG. 10 is a flow chart of the procedures of a second embodiment.

Turning now to FIG. 10, in the event that there is no server machine X and instead there are a multiplicity of individual reachability tables, then each of the machines is able to detect failure of any one of the other machines (for example, by means of all machines providing a predetermined message at regular intervals). In addition, each of the continuing machines M1, M3 . . . Mn carries out steps 101-105 of FIG. 10 which are equivalent to steps 91-95 of FIG. 9, but in respect of its local reachability table. The result is step 106 in that no further action is required and that each of the local reachability tables makes no reference to machine M2 (i.e., has the column containing the "2's" empty—or removed).

Figures 11, 12:
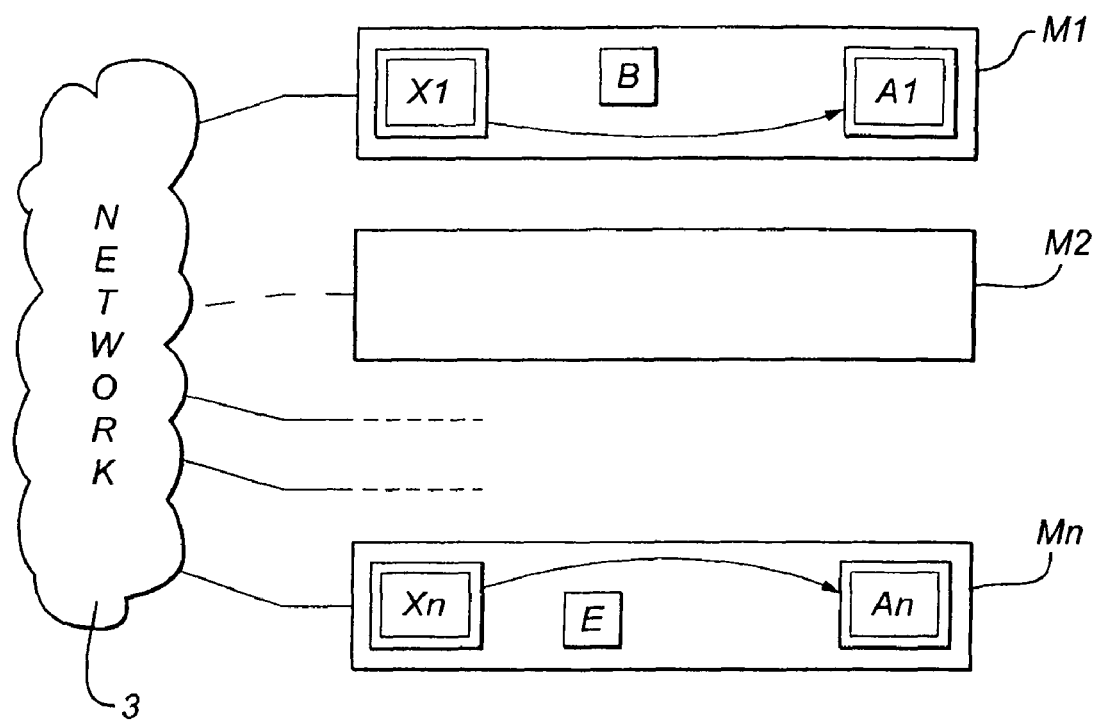
FIG. 11 is a map similar to FIG. 6 but illustrating the situation of a break in communications with machine M2.
FIG. 12 shows the single reachability table in the circumstance of FIG. 11.

FIG. 11 schematically illustrates the situation where machine M2 is dead. This might be due to a power failure or, as indicated in FIG. 11, due to a break in the link between machine M2 and the communications network 53. The changed reachability tables (single and multiple) are respectively illustrated in FIGS. 12 and 13.

Thus the effect of the procedure of either FIGS. 9 and 10 is to remove the column from the table of FIG. 7 which makes reference to machine 2. As a result, the in due course updating of corresponding memory locations X1, Xn and A1, An can take place without machine M2 being active.

Therefore any action which requires an acknowledgement from machine M2, such as a response to the question "Has a data packet been received without error?" and for which no response is possible because machine M2 has failed, does not delay the functioning of the other machines M1, M3, . . . Mn. As a consequence, those portions of the application program 5 which are executing on the continuing machines M1, M3, . . . Mn continue to execute without interruption.

It will also be apparent to those skilled in the art that the failure of machine M2 is not in any way special or restricted to the second machine. That is, it could have been any one of the machines which failed. Thus, if another machine should now fail, the same procedure is carried out. Therefore successive failure of each of a number of machines in turn can be tolerated, and without loss of memory since the contents of memory locations X2 and A2 are duplicated elsewhere whilst the content of memory location D will in due course be regenerated by the re-execution of the code previously executing on machine M2, being carried out by one of the continuing machines.

The foregoing describes only some embodiments of the present invention and modifications, obvious to those skilled in the art, can be made thereto without departing from the scope of the present invention. For example, the tables of FIGS. 4 and 7 each show a row corresponding to each memory location. In practice, for those memory locations such as D and E which are only accessible by their local machine, it is not necessary to have a row in the table at all. Instead, such a row is only created if the memory location becomes accessible by one or more other machines. For example, reference to JAVA includes both the JAVA language and also JAVA platform and architecture.

Similarly, the above described arrangements envisage n computers each of which shares a fraction (1/nth) of the application program. Under such circumstances all n computers have the same local memory structure. However, it is possible to operate such a system in which a subset only of the computers has the same local memory structure. Under this scenario, the maximum number of members of the subset is to be regarded as n the in the description above.

In all described instances of modification, where the application code 50 is modified before, or during loading, or even after loading but before execution of the unmodified application code has commenced, it is to be understood that the modified application code is loaded in place of, and executed in place of, the unmodified application code subsequently to the modifications being performed.

Alternatively, in the instances where modification takes place after loading and after execution of the unmodified application code has commenced, it is to be understood that the unmodified application code may either be replaced with the modified application code in whole, corresponding to the modifications being performed, or alternatively, the unmodified application code may be replaced in part or incrementally as the modifications are performed incrementally on the executing unmodified application code. Regardless of which such modification routes are used, the modifications subsequent to being performed execute in place of the unmodified application code.

It is advantageous to use a global identifier is as a form of 'meta-name' or 'meta-identity' for all the similar equivalent local objects (or classes, or assets or resources or the like) on each one of the plurality of machines M1, M2 . . . Mn. For example, rather than having to keep track of each unique local name or identity of each similar equivalent local object on each machine of the plurality of similar equivalent objects, one may instead define or use a global name corresponding to the plurality of similar equivalent objects on each machine (e.g. "globalname7787"), and with the understanding that each machine relates the global name to a specific local name or object (e.g. "globalname7787" corresponds to object "localobject456" on machine M1, and "globalname7787" corresponds to object "localobject885" on machine M2, and "globalname7787" corresponds to object "localobject111" on machine M3, and so forth).

It will also be apparent to those skilled in the art in light of the detailed description provided herein that in a table or list or other data structure created by each DRT 71 when initially recording or creating the list of all, or some subset of all objects (e.g. memory locations or fields), for each such recorded object on each machine M1, M2 . . . Mn there is a name or identity which is common or similar on each of the machines M1, M2 . . . Mn. However, in the individual machines the local object corresponding to a given name or identity will or may vary over time since each machine may, and generally will, store memory values or contents at different memory locations according to its own internal processes. Thus the table, or list, or other data structure in each of the DRTs will have, in general, different local memory locations corresponding to a single memory name or identity, but each global "memory name" or identity will have the same "memory value or content" stored in the different local memory locations. So for each global name there will be a family of corresponding independent local memory locations with one family member in each of the computers. Although the local memory name may differ, the asset, object, location etc has essentially the same content or value. So the family is coherent.

The term "table" or "tabulation" as used herein is intended to embrace any list or organised data structure of whatever format and within which data can be stored and read out in an ordered fashion.

It will also be apparent to those skilled in the art in light of the description provided herein that the abovementioned modification of the application program code 50 during loading can be accomplished in many ways or by a variety of means. These ways or means include, but are not limited to at least the following five ways and variations or combinations of these five, including by:

(i) re-compilation at loading,
(ii) a pre-compilation procedure prior to loading,
(iii) compilation prior to loading,
(iv) "just-in-time" compilation(s), or
(v) re-compilation after loading (but, for example, before execution of the relevant or corresponding application code in a distributed environment).

Traditionally the term "compilation" implies a change in code or language, for example, from source to object code or one language to another. Clearly the use of the term "compilation" (and its grammatical equivalents) in the present specification is not so restricted and can also include or embrace modifications within the same code or language.

Those skilled in the computer and/or programming arts will be aware that when additional code or instructions is/are inserted into an existing code or instruction set to modify same, the existing code or instruction set may well require further modification (such as for example, by re-numbering of sequential instructions) so that offsets, branching, attributes, mark up and the like are properly handled or catered for.

Similarly, in the JAVA language memory locations include, for example, both fields and array types. The above description deals with fields and the changes required for array types are essentially the same mutatis mutandis. Also the present invention is equally applicable to similar programming languages (including procedural, declarative and object orientated languages) to JAVA including Microsoft.NET platform and architecture (Visual Basic, Visual C/C$^{++}$, and C#) FORTRAN, C/C$^{++}$, COBOL, BASIC etc.

The terms object and class used herein are derived from the JAVA environment and are intended to embrace similar terms derived from different environments such as dynamically linked libraries (DLL), or object code packages, or function unit or memory locations.

Various means are described relative to embodiments of the invention, including for example but not limited to lock means, distributed run time means, modifier or modifying means, and the like. In at least one embodiment of the invention, any one or each of these various means may be implemented by computer program code statements or instructions (possibly including by a plurality of computer program code statements or instructions) that execute within computer logic circuits, processors, ASICs, logic or electronic circuit hardware, microprocessors, microcontrollers or other logic to modify the operation of such logic or circuits to accomplish the recited operation or function. In another embodiment, any one or each of these various means may be implemented in firmware and in other embodiments such may be implemented in hardware. Furthermore, in at least one embodiment of the invention, any one or each of these various means may be implemented by a combination of computer program software, firmware, and/or hardware.

Any and each of the abovedescribed methods, procedures, and/or routines may advantageously be implemented as a computer program and/or computer program product stored on any tangible media or existing in electronic, signal, or digital form. Such computer program or computer program products comprising instructions separately and/or organized as modules, programs, subroutines, or in any other way for execution in processing logic such as in a processor or microprocessor of a computer, computing machine, or information appliance; the computer program or computer program products modifying the operation of the computer in which it executes or on a computer coupled with, connected to, or otherwise in signal communications with the computer on which the computer program or computer program product is present or executing. Such a computer program or computer program product modifies the operation and architectural structure of the computer, computing machine, and/or information appliance to alter the technical operation of the computer and realize the technical effects described herein.

The invention may therefore include a computer program product comprising a set of program instructions stored in a storage medium or existing electronically in any form and operable to permit a plurality of computers to carry out any of the methods, procedures, routines, or the like as described herein including in any of the claims.

Furthermore, the invention includes (but is not limited to) a plurality of computers, or a single computer adapted to interact with a plurality of computers, interconnected via a communication network or other communications link or path and each operable to substantially simultaneously or concurrently execute the same or a different portion of an application code written to operate on only a single computer on a corresponding different one of computers. The computers are programmed to carry out any of the methods, procedures, or routines described in the specification or set forth in any of the claims, on being loaded with a computer program product or upon subsequent instruction. Similarly, the invention also includes within its scope a single computer arranged to co-operate with like, or substantially similar, computers to form a multiple computer system To summarise, there is provided a failure resistant method of operating a plurality of computers each with their corresponding independent local memory, each substantially simultaneously operating a corresponding portion of an application program written to execute on only a single computer, and each being connected via a communications network to permit updating of corresponding memory locations, the method comprising the steps of:

(i) categorizing the memory locations of the local memories into a first reachability category in which the local memory locations are replicated in selected ones, or all, of the computers and therefore require updating via the communications network with changes to corresponding memory locations of the other computers to maintain substantial memory coherence, and into a second category in which the local memory locations are present only in the local computer and therefore no updating is required, (ii) detecting failure of any one of the multiple computers, and (iii) modifying the first category to remove therefrom, if present, any reference to the failed computer, whereby no attempt is made to update any first category locations of the failed computer.

Preferably the method includes the further step of, (iv) maintaining data regarding the memory locations categorization in a reachability table.

Preferably the method includes the further step of:

(v) maintaining a single the reachability table on a server computer not forming one of the multiple computers and connected thereto via the communications network.

Alternatively the method includes the further step of:

(vi) maintaining a multiplicity of reachability tables, each on a corresponding one of the multiple computers.

Preferably the method includes the further step of;

(vii) detecting failure by at least one of the group of failure detection modes consisting of power supply failure, communication link failure, failure to respond to interrogation, and failure to regularly report as expected.

Preferably the memory locations include an asset, structure or resource.

There is also provided a computer program product comprising a set of program instructions stored in a storage medium and operable to permit a plurality of computers to carry out the above described method(s).

Also provided is a plurality of computers interconnected via a communications network and operable to ensure carrying out any of the above method(s).

Further there is provided a failure resistant multiple computer system in which a plurality of computers each has a corresponding independent local memory, each simultaneously operates a corresponding portion of an application program written to be executed only on a single computer, and each is connected via a communications network to permit updating of corresponding memory locations, the system including a reachability means to categorize memory locations of the local memories into a first category in which the local memory locations are replicated in selected ones, or all, of the computers and therefore require updating via the communications network with changes to corresponding memory locations of other computers, to maintain substantial memory coherence, and into a second category in which the local memory locations are present only in the local computer and therefore no updating is required, and wherein the system further includes a failure detection means connected to each the computer to detect failure of any one of the multiple computers, and a reachability modifier connected to the failure connection means and to the reachability means to modify the reachability means by modifying the first category to remove therefrom, if present, any reference by the failed computer whereby no attempt is made to update any first category memory locations of the failed computer.

Preferably the reachability means comprises a reachability table in which is maintained data regarding the memory location classification.

Preferably a server computer is connected to the communications network, the server computer including a single reachability table.

Alternatively each of the multiple computers includes a corresponding reachability table.

Preferably the failure detection means is selected from the group consisting of power supply failure detectors, communication link failure detectors, interrogation response failure detectors, and regular reporting failure detectors.

Preferably the memory locations include an asset, structure or resource.

Also provided is a single computer adapted to co-operate with at least one other computer in order to carry out any of the above method(s) or form any of the above computer systems.

The term "comprising" (and its grammatical variations) as used herein is used in the inclusive sense of "having" or "including" and not in the exclusive sense of "consisting only of".

The invention claimed is:

1. A failure resistant method of operating a plurality of computers each with their corresponding independent local memory which is unable to be accessed by any other of said computers, each of said computers substantially simultaneously operating a corresponding portion of an application program written to execute on only a single computer, and each being connected via a communications network to permit updating of corresponding memory locations, said method comprising the steps of:

(i) satisfying all read requests made by any one of said computers by only reading the independent local memory of the computer making the read request, wherein the independent local memory of the computer making the read request is unable to be accessed by any other of said computers, (ii) categorizing the memory locations of said local memories into a first reachability category in which the local memory locations are replicated as to contents stored in the memory locations in selected ones, or all, of said computers and therefore require updating via said communications network with changes to corresponding memory locations of the other computers to maintain substantial memory coherence, and into a second category in which the local memory locations are not replicated and are present only in the local computer and therefore no updating is required, (iii-a) detecting failure of any one of said multiple computers, and (iii-b) modifying said first category to remove therefrom, if present, any reference to the failed computer, wherein no attempt is made to update any first category locations of said failed computer.

2. The method as claimed in claim 1 including the further step of, (iv-a) maintaining data regarding said memory locations categorization in a reachability table.

3. The method as claimed in claim 2 including the further step of:

(v-a) maintaining a single said reachability table on a server computer not forming one of said multiple computers and connected thereto via said communications network.

4. The method as claimed in claim 2 including the further step of:

(v) maintaining a multiplicity of reachability tables, each on a corresponding one of said multiple computers.

5. The method as claimed in claim 1 including the further step of:

(iv) detecting failure by at least one of the group of failure detection modes consisting of power supply failure, communication link failure, failure to respond to interrogation, and failure to regularly report as expected.

6. The method as claimed in claim 1 wherein said memory locations include an asset, structure or resource.

7. A computer program product comprising a set of program instructions stored in a storage medium and operable to permit a plurality of computers to carry out the method claimed in claim 1.

8. The computer program product as claimed in claim 7, wherein the local memory is unable to be accessed by other computers and all read requests by the computer making the read request are satisfied locally from the local independent memory.

9. A multiplicity of computers interconnected via a communications network and operable to ensure carrying out of the method as claimed in claim 1.

10. The multiplicity of computers as claimed in claim 9, wherein the local memory is unable to be accessed by other computers and all read requests by the computer making the read request are satisfied locally from the local independent memory.

11. A single computer adapted to co-operate with at least one like other computer in order to carry out the method as claimed in claim 1.

12. A single computer as claimed in claim 11, wherein the local memory is unable to be accessed by other computers and all read requests by the computer making the read request are satisfied locally from the local independent memory.

13. The method as claimed in claim 1, wherein the local memory is unable to be accessed by other computers and all read requests by the computer making the read request are satisfied locally from the local independent memory.

14. The method as claimed in claim 1, wherein the updating via said communications network with changes to corresponding memory locations of the other computers to maintain substantial memory coherence comprises writing to the corresponding memory locations of the other computers to maintain substantial memory coherence.

15. A method as in claim 1, wherein:

said local memory(ies) of each said computer are independent of said local memory(ies) of each other computer and each said computer has a local processor that may only access said local memory(ies) of the same computer in which the local processor is located;

at least a first application program written to operate on a single one of said computers, is operating substantially simultaneously on different ones of said multiple computers;

said application program operating substantially simultaneously on each of said different ones of said computers, may only access said local memory(ies) of the same computer;

said access is satisfied by said local memory(ies) of the same computer independently of (or without the aid of) said local memory(ies) of any other computer;

said access includes reading and/or writing content or values stored or resident within said local memory(ies) of the same computer, or said access is restricted to reading and/or writing content or values stored or resident within said local memory(ies) of the same computer;

said access includes reading and/or writing content or values of real or virtual memory addresses of or resident within said local memory(ies) of the same computer, or said access is restricted to reading and/or writing content or values of real or virtual memory addresses of or resident within said local memory(ies) of the same computer;

at least one memory location and/or memory value of said application program is substantially similarly replicated in said local memory(ies) of said different ones of said plurality of computers;

said substantially similarly replicated memory location(s) and/or value(s) are stored non-identically in said local memory(ies) of said different ones of said plurality of computers;

said substantially similarly replicated memory location(s) and/or memory value(s) are updated through in-due-course updating to remain substantially similar upon occasion of any one of said plurality of computers simultaneously operating said application program modifying, or causing to be modified, the value(s) or content(s) of said substantially similarly replicated memory location(s) and/or memory value(s);

each said substantially similarly replicated memory location(s) and/or value(s) of each one of said multiple computers is identified with a substantially similar identifier; and said in-due-course updating provides that said replicated memory locations are updated to remain substantially similar upon occasion of any one of said computers simultaneously operating said application program causing modification of the contents of said replicated memory location.

16. A failure resistant multiple computer system in which a plurality of computers each has a corresponding independent local memory which is unable to be accessed by any other of said computers, each of said computers simultaneously operates a corresponding portion of an application program written to be executed only on a single computer, and each is connected via a communications network to permit updating of corresponding memory locations, said system including:

a local memory independence means associated with each said local memory to satisfy all read requests from the local memory of the computer making the read request, a reachability means to categorize memory locations of said local memories into a first category in which the local memory locations are replicated as to contents stored in the memory locations in selected ones, or all, of said computers and therefore require updating via said communications network with changes to corresponding memory locations of other computers, to maintain substantial memory coherence, and into a second category in which the local memory locations are not replicated and are present only in the local computer and therefore no updating is required, and wherein said system further includes:

a failure detection means connected to each said computer to detect failure of any one of said multiple computers, and a reachability modifier connected to said failure detection means and to said reachability means to modify said reachability means by modifying said first category to remove therefrom, if present, any reference by the failed computer whereby no attempt is made to update any first category memory locations of said failed computer, wherein the local memory independence means is unable to be accessed by other computers and all read requests by the computer making the read request are satisfied locally from the local independent memory.

17. The system as claimed in claim 16 wherein said reachability means comprises a reachability table in which is maintained data regarding said memory location classification.

18. The system as claimed in claim 17 and including a server computer connected to said communications network, said server computer including a single reachability table.

19. The system as claimed in claim 17 wherein each of said multiple computers includes a corresponding reachability table.

20. The system as claimed in claim 16 wherein said failure detection means is selected from the group consisting of power supply failure detectors, communication link failure detectors, interrogation response failure detectors, and regular reporting failure detectors.

21. The system as claimed in claim 16 wherein said memory locations include an asset, structure or resource.

22. A single computer adapted to co-operate with at least one other like computer to form the multiple computer system as claimed in claim 16.

23. A single computer as claimed in claim 22, wherein the local memory is unable to be accessed by other computers and all read requests by the computer making the read request are satisfied locally from the local independent memory.

24. A system as in claim 16, wherein:

said local memory(ies) of each said computer are independent of said local memory(ies) of each other computer and each said computer has a local processor that may only access said local memory(ies) of the same computer in which the local processor is located;

at least a first application program written to operate on a single one of said computers, is operating substantially simultaneously on different ones of said multiple computers;

said application program operating substantially simultaneously on each of said different ones of said computers, may only access said local memory(ies) of the same computer;

said access is satisfied by said local memory(ies) of the same computer independently of (or without the aid of) said local memory(ies) of any other computer;

said access includes reading and/or writing content or values stored or resident within said local memory(ies) of the same computer, or said access is restricted to reading and/or writing content or values stored or resident within said local memory(ies) of the same computer;

said access includes reading and/or writing content or values of real or virtual memory addresses of or resident within said local memory(ies) of the same computer, or said access is restricted to reading and/or writing content or values of real or virtual memory addresses of or resident within said local memory(ies) of the same computer;

at least one memory location and/or memory value of said application program is substantially similarly replicated in said local memory(ies) of said different ones of said plurality of computers;

said substantially similarly replicated memory location(s) and/or value(s) are stored non-identically in said local memory(ies) of said different ones of said plurality of computers;

said substantially similarly replicated memory location(s) and/or memory value(s) are updated through in-due-course updating to remain substantially similar upon occasion of any one of said plurality of computers simultaneously operating said application program modifying, or causing to be modified, the value(s) or content(s) of said substantially similarly replicated memory location(s) and/or memory value(s);

each said substantially similarly replicated memory location(s) and/or value(s) of each one of said multiple computers is identified with a substantially similar identifier; and said in-due-course updating provides that said replicated memory locations are updated to remain substantially similar upon occasion of any one of said computers simultaneously operating said application program causing modification of the contents of said replicated memory location.

25. A failure resistant method of operating a plurality of computers, the method comprising:

configuring each of said plurality of computers with their own corresponding independent local memory so that each independent local memory is unable to be accessed by any other ones of said plurality of computers and all read requests from each said computer are satisfied from the local memory of the computer making the read request;

operating on each of said computers substantially simultaneously a corresponding portion of an application program written to execute on only a single computer;

connecting each of said plurality of computers via a communications network to permit updating of corresponding memory locations in the local memory of each of the plurality of computers;

categorizing the memory locations of said local memories into:

(a) a first reachability category in which the local memory locations are replicated as to contents stored in the memory locations in selected ones, or all, of said computers and therefore require updating via said communications network with changes to corresponding memory locations of the other computers to maintain substantial memory coherence; and (b) a second category in which the local memory locations are not replicated and are present only in the local computer and therefore no updating is required;

detecting failure of any one of said plurality of computers; and modifying said first reachability category to remove therefrom, if present, any reference to the failed computer, and making no attempt to update any first reachability category memory locations of said failed computer.

26. The method as claimed in claim 25, further comprising:

not modifying said first reachability category to remove any reference to any non-failed computer, and updating said first reachability category memory locations of said non-failed computer when a memory location is modified or written to.

27. The method as claimed in claim 25, wherein the method further comprises:

replicating the local memory locations as to contents stored in the memory locations in selected ones, or all, of said computers; and updating via said communications network said replicating the local memory locations with changes to corresponding memory locations of the other computers to maintain substantial memory coherence among said plurality of computers.

28. A single computer adapted to co-operate with at least one like other computer in order to carry out the method as claimed in claim 25.

29. The method as claimed in claim 25, wherein the local memory is unable to be accessed by other computers and all read requests by the computer making the read request are satisfied locally from the local independent memory.

30. A failure resistant multiple computer system comprising:

a plurality of computers each having a corresponding independent local memory which is unable to be accessed by any other of said computers, and each of said computers configured to simultaneously operate a corresponding different portion of an application program written to be executed only on a single computer;

each said computer being connected to each other computer via a communications network to permit updating of corresponding memory locations;

a local memory independence means associated with each said local memory to satisfy all read requests from the local memory of the computer making the read request, a reachability means to categorize memory locations of said local memories into:

(a) a first category in which the local memory locations are replicated as to contents stored in the memory locations in selected ones, or all, of said computers and therefore require updating via said communications network with changes to corresponding memory locations of other computers, to maintain substantial memory coherence; and (b) a second category in which the local memory locations are not replicated and are present only in the local computer and therefore no updating is required;

a failure detection means connected to each said computer to detect failure of any one of said plurality of computers, and a reachability modifier connected to said failure detection means and to said reachability means to modify said reachability means by modifying said first category to remove therefrom, if present, any reference by the failed computer and making no attempt to update any first reachability category memory locations of said failed computer, wherein the local memory is unable to be accessed by other computers and all read requests by the computer making the read request are satisfied locally from the local independent memory.

31. The system as claimed in claim 30, wherein said reachability modifier connected to said failure detection means and to said reachability means is configured for and operative to not modify said first reachability category to remove any reference to any non-failed computer, and updating said first reachability category memory locations of said non-failed computer when a memory location is modified or written to.

32. The system as claimed in claim 30, wherein the system further comprises:

memory replication means for replicating the local memory locations as to contents stored in the memory locations in selected ones, or all, of said computers; and updating means for updating said replicated memory locations via said communications network said replicating the local memory locations with changes to corresponding memory locations of the other computers to maintain substantial memory coherence among said plurality of computers.

33. A single computer adapted to co-operate with at least one other like computer to form the multiple computer system as claimed in claim 30.

* * * * *